March 10, 1964  W. R. STEWART ETAL  3,123,866
STAVES
Filed Feb. 25, 1959  2 Sheets-Sheet 1
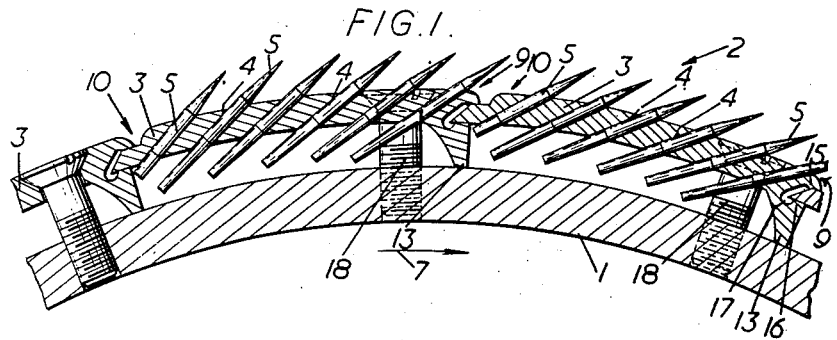
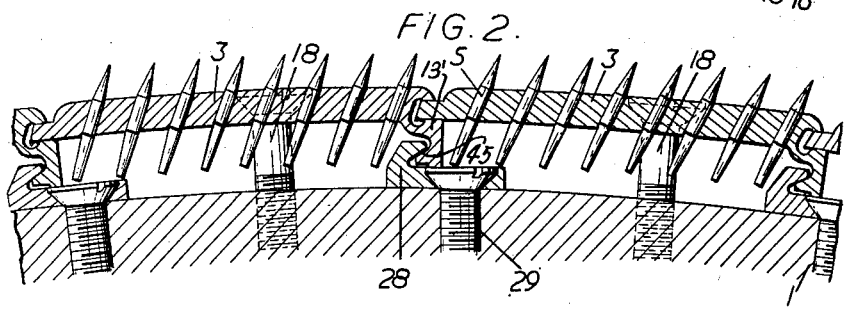
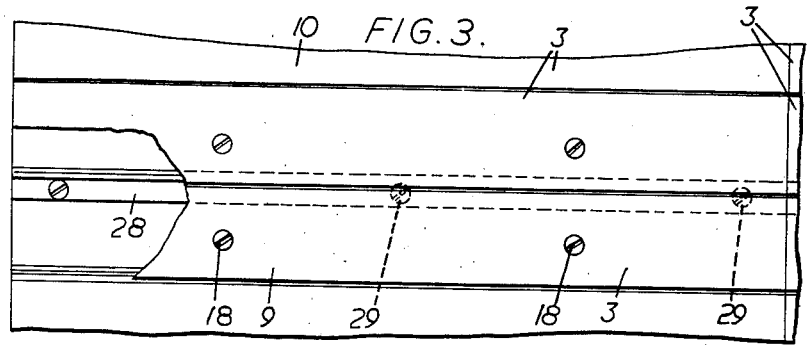
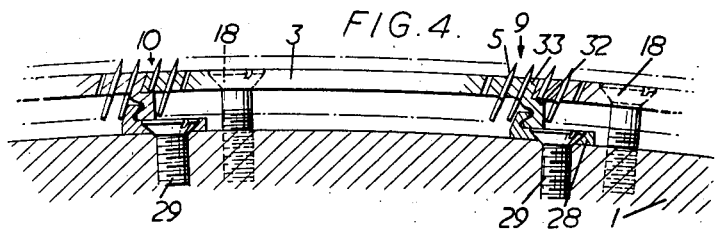
Inventors
William Rennie Stewart
David Bruce Stewart
and Joseph Butler
By
Mead, Browne, Schuyler & Beveridge
Attorneys March 10, 1964 W. R. STEWART ETAL 3,123,866
STAVES
Filed Feb. 25, 1959 2 Sheets-Sheet 2
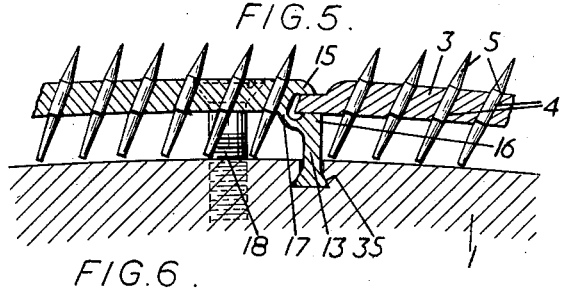
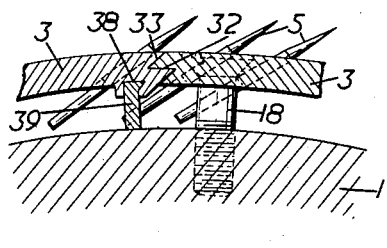
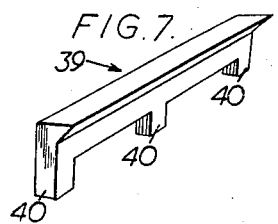
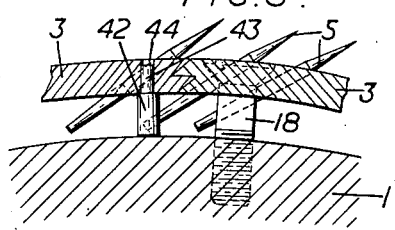
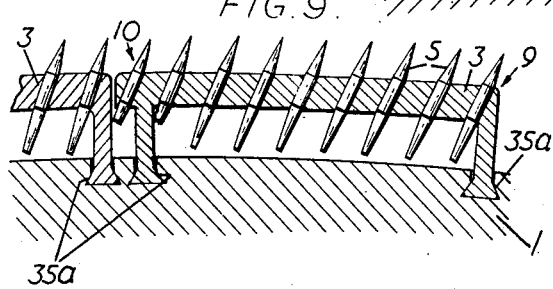
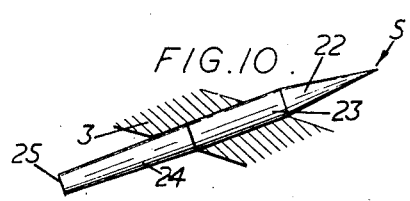

United States Patent Office 3,123,866
Patented Mar. 10, 1964

3,123,866
STAVES
William Rennie Stewart and David Bruce Stewart, Angus, and Joseph Butler, Dundee, Scotland, assignors to Wm. R. Stewart & Sons (Hacklemakers) Ltd., Dundee, Scotland
Filed Feb. 25, 1959, Ser. No. 795,541
Claims priority, application Great Britain Feb. 25, 1958
33 Claims. (Cl. 19—97)

This invention relates to the clothing used in carding machines on the various drums, i.e. the main drum or "cylinder" which is generally about 4 or 5 feet in diameter and the surrounding smaller drums or "rollers." Such clothing is made up from a number of separate so-called staves or lags, that is to say elongated members, which are formed with three or more rows of holes through which pins are inserted, and which are of generally rectangular part-cylindrical shape, curved about an axis extending parallel to the length of the member. These staves have hiterto been held in place on a drum in the machine solely by means of screws passing through the staves, and these staves have had their curved concave rear surfaces in face to face contact with the outer surface of the drum. The points of the pins protrude above the outer convex surface of the staves to work the fibre being carded. Such an arrangement is shown, for example, in our British patent specification No. 739,311.

These previously known staves suffer from several disadvantages. First of all, if the staves, which have generally been made hitherto of wood, are made of the same size and shape but of a stronger material such as aluminium, they are heavier (because suitable strong materials are denser than wood) besides being more expensive and more difficult to drill, in order to form the holes for the pins. If, to overcome this, the staves are made thinner, the effective diameters of the various drums and their clothing in a carding machine are reduced, and this involves adjustment in the relative positions of the drums, which is not always possible in existing machines. A further disadvantage is that when a pin wears and has to be replaced, or if a pin breaks, the portion remaining has to be punched out and this can be a lengthy and tedious business. A further disadvantage, this time of the pins themselves, is that they are sometimes so short that they are difficult to handle individually.

According to the basic principle of the present invention, the staves are spaced from the drum. Each stave may then be made thin and thus light and easy to drill, without causing any change in the effective diameter of the drum on which it is mounted, so that the necessity for relative adjustment of the various drums in the carding machine is avoided. The rear of the pins need not now be flushed with the rear of the stave, as hitherto, but instead each pin may be provided with an integral tail which projects behind the stave and tapered for a length at least equal to that gripped by the stave, so that by simply hammering the rear of the pins, without employing a punch, the pin can be ejected. By providing each pin with such a tail it is lengthened and as a consequence is easier to handle than a similar pin adapted to have its rear flush with the rear of the stave.

The invention may be carried out in one of two different ways. First of all the stave itself may be provided on its rear face with one or more projections which serve to space the rear face of the stave from the drum on which the stave is mounted. Alternatively, the projections may be provided, not on the stave but on the drum, and the stave is then characterised by the provision in its rear face of one or more openings or recesses which receive the projections on the drum.

Although each stave may be provided with projections at both its leading and trailing edges, for the sake of simplicity and cheapness and also for convenience in drilling the stave and inserting the pins, it is preferred to provide a projection at only the leading edge of the stave. This leading edge is then shaped to cooperate with the trailing edge of an adjacent identical stave so as to hold this trailing edge away from the drum. Two alternative shapes for the leading edge have been devised. In the first, the leading edge is shaped to constitute a pair of jaws and screw holes are provided in the stave so that as the latter is screwed onto the drum the jaws come together to grip the trailing edge of the adjacent stave. Preferably, the screw holes lie adjacent the leading edge of the stave in order to bring about a substantial gripping action. In the alternative construction, the lower jaw is retained and provides a seating for supporting the trailing edge of the adjacent stave and for holding it away from the drum. The upper jaw, however, is now in the form of an overhanging portion which is fixed relatively to the seating, so that no gripping action takes place as the staves are being screwed onto the drum. This overhanging portion nevertheless prevents the staves being pulled away from the roller.

The projection (or each projection) of each stave may be a continuous one, so that then the stave is of substantially the same cross section at all points of its length. Preferably, however, the projection stands out from the rear face of the stave at spaced points in order to prevent the fouling of pins inserted into the adjacent stave near the trailing edge of that stave.

Preferably the projection (or each projection) of each stave is adapted to interfit with the drum, or with a base secured to the drum, so as to hold the stave, the interfit being such as to permit the stave to be slid longitudinally with respect to the drum or alternatively to permit the stave to be unhooked. It will be appreciated that by employing such an interfit, a significant reduction may be made in the number of screws actually passing through the staves since the interfit itself helps to hold the stave down. In this way, the number of screws which must be unscrewed to permit removal of any given stave, or all the staves, on a drum is significantly reduced. That this can be a considerable advantage will be realised from the fact that in order to replace all the staves on one particular drum, 750 screws have to be unscrewed.

Several staves in accordance with the invention will now be described with reference to the accompanying drawings in which:

FIGURES 1, 2, 4, 5, 6, 8 and 9 are cross sections of parts of various drums and their clothing, the latter being made up of various designs of staves in accordance with the present invention, it being understood that staves of only one design are employed with any one roller;

FIGURE 3 is a plan view of the staves shown in FIGURE 2;

FIGURE 7 is a perspective view of the projection shown in FIGURE 6;

FIGURE 10 is an enlarged cross section of a pin employed in a stave in accordance with the invention, and also showing a portion of the stave itself.

Referring first of all to FIGURE 1, a drum, in the form of a small diameter conventional roller 1, is provided with clothing, indicated generally at 2. In general appearance, the roller 1 and its clothing 2 resemble FIGURE 1 of our abovementioned British patent specification and are arranged, with a number of similar rollers and clothing to cooperate with a large diameter cylinder in a carding machine. The clothing 2 is made up from a number of separate staves 3 which are drilled with holes 4 through which pins 5 are inserted and which are of generally rectangular part-cylindrical shape which is curved about an axis extending perpendicular to the plane of FIGURE 1 and lying coincident with the axis of the roller 1. Each stave 3 is made of aluminium, magnesium or other light metal or alloy, whilst each of the pins 5 is of hardened steel. In the carding machine the roller 1 is arranged to move in a clockwise direction as indicated by the arrow 7, the edge 9 of each stave 5 (i.e. the edge towards which the pins are angled) constituting the leading edge of the stave, whilst the edge 10 constitutes its trailing edge. On the rear face of each stave 3 there is provided at only the leading edge 9 a projection 13. The leading edge is shaped to constitute a pair of jaws 15, 16, the lower jaw 16 being disposed at the top end of the projection 13. The two jaws 15 and 16 are connected together through a portion 17 which is weakened so as to yield to permit the jaws 15 and 16 to come together when the stave 3 is screwed upon the roller 1 by means of screws. Three screws are provided for each stave, the second and third screws being disposed directly behind the screw shown at 18 in FIGURE 1. The three screw holes for these screws lie adjacent the leading edge 9 of the stave so as to distort to a considerable extent the weakened portion 17 and thus bring the jaws 15 and 16 firmly together. These jaws 15 and 16 are arranged to grip the trailing edge 10 of the adjacent identical stave so as to hold this trailing edge firmly in position away from the roller 1. It will be appreciated, therefore, that by providing the projections 13 and the jaws 15 and 16 the rear face of the stave 3 is spaced from and lies parallel to the outer face of the roller 1. This permits the pins 5 to be provided with integral tails which stick out from the back of the rear face of the stave 3. The pins 5 may therefore be made longer than hitherto and are therefore more easily handled.

For each stave, anything from 45 to about 30,000 pins may be employed ranging from 3 rows of 15 pins to 62 rows of 480 pins. In this particular stave 6 rows of 30 pins each are employed. Apart from the pins in the row at the trailing edge, each pin 5 is as shown in detail in FIGURE 10. The pin 5 comprises a front pointed portion 22, a cylindrical middle portion 23 which fits into one of the holes 4, and an integral tail in the form of a tapered rear portion 24 having a flat end 25. When, as in FIGURE 10, the middle portion is of the same length as the hole 4, the tapered portion 24 is made longer than this middle portion so that the pin 5 may be removed from the stave 3 by hammering from the rear, without the need for a punch. The pins 5 in the rear row have somewhat shorter tails 24 so as to avoid fouling the projection 13 which is a continuous projection extending all the way along the length of the stave 3.

The length of the pointed front portion is governed by the projection of the pin above the stave required for the type of fibre being worked, for example being less for fibres such as wool and cotton than for fibres such as jute and hemp. The middle cylindrical portion of the pin is governed of course by the thickness of the stave 3 and the angle of insertion of the pins. The length of the pin may be anything between ½" and 3", and the diameter of the middle portion may be anything between ⅜" and 0.012". In general, the longer the pin the greater the diameter, and the length of the pin may be anything between 10 and 25 times the diameter of its middle portion.

The arrangement shown in FIGURES 2 and 3 differs from that shown in FIGURE 1 in the following respects. First of all, the drum is in the form of a cylinder 1, having a larger diameter than the roller 1 so that the curved nature of the staves 3 is less pronounced. Secondly, 8 rows of pins 5 are provided instead of only 6. Thirdly, the pins are more nearly vertical and as a result the tapered portions of the rear row of pins 5 may be made longer without interfering with the projection 13. Fourthly, the two holes for the screws are arranged substantially mid-way between the leading and trailing edges of the staves 3, so that the gripping action of the jaws 15 and 16 is not quite so great. Fifthly, only two screws 18, instead of three, are employed passing through each stave. Finally, and most important of all, the projection 13 interfits with a base in the form of a metal strip 28 which extends along the whole length of the cylinder 1. The strip 28 is secured to the cylinder 1 by means of screws 29, of which there are three for every length of stave. The interfit between the projection 13', which has a projecting portion or foot 45 and the strip 28 serves to hold the stave down at its leading edge. In addition, by simply removing the screws 18, the stave 3 may be removed by sliding it longitudinally with respect to the cylinder. Alternatively, the stave may be unhooked when once the adjacent staves have had their screws 18 removed and the staves themselves moved together to generate sufficient space for the unhooking. The screws 18 and 29 employ the same screw holes in the cylinder 1 as have hitherto been used for the five screws passing directly through the previously known staves, so that the cylinder does not need to be re-drilled. In this construction, only two of the five screws actually pass through the stave, so that the area on each stave formerly taken up by three of the screws can now be occupied by pins.

The construction shown in FIGURE 4 differs from that shown in FIGURES 2 and 3 in several respects and is suitable for working finer fibres, where a great density of small pins is required. First of all, a considerably larger number of rows of pins is provided. Secondly, instead of providing jaws which come together as the stave is being screwed into place on the cylinder, the leading edge 9 of each stave 3 is formed with a seating 32 which supports the trailing edge 10 of the adjacent identical stave and holds it away from the cylinder 1. An overhanging portion 33 is provided at the leading edge which cooperates with the adjacent trailing edge to prevent the latter being pulled away from the cylinder, the overhanging portion 33 and the seating 32 being fixed relatively to one another. The screws 18 lie adjacent the trailing edge of the stave rather than the leading edge. The form of interlock having the seating 32 and the overhanging portion 33 may of course be employed with the stave shown in FIGURE 1 or that shown in FIGURE 2. With this form of interlock the projection may be drilled to receive the tails of the rear row of pins of the adjacent stave, so that then all the pins may be of the same length. The holes drilled through the projection are of course at the same angle as the pins themselves, but are preferably somewhat larger in diameter. The tails of the rear row of pins serve to increase the strength of the interlock.

The only significant difference between the construction shown in FIGURE 5 and that shown in FIGURE 1 is that each projection 13 interfits with the drum through a dovetail section slot 35 which is formed in the drum and extends along its length so as to permit the stave to be removed from the drum by longitudinal sliding. The slot 35 ensures that the stave is strongly held by the drum.

In the construction shown in FIGURES 6 and 7, each stave 3 is provided in its rear face with a recess 38 which extends along the whole length of the stave. This recess 38 receives a projection 39 which is shown in FIGURE 7. This projection 39 provided on the stave is not a continuous projection like the projection 13 but stands out from the rear face of the stave at spaced points, being formed with a series of spaced legs 40. This ensures that the rear row of pins of the adjacent stave 3 do not foul the projection, even though the tails of the rear row of pins be made as long as the others. In the construction shown in FIGURE 6, the projection 39 is capable of longitudinal sliding in the recess 38. However, in an alternative construction the projection 39 is integral with the stave 3. The leading edge of this stave 3 is formed with a seating 32 and an overhanging portion 33 like the stave shown in FIGURE 4.

The construction shown in FIGURE 8 is similar to that shown in FIGURE 6, but here the projection, instead of being in the form of a unit, comprises a number of separate cylindrical pegs 42, having upper ends 43 of reduced diameter which fits into openings 44 formed through the staves 3. These pegs may be welded either to the stave or to the drum.

In the construction shown in FIGURE 9, the stave 3 is provided with projections at both its leading and trailing edges. These projections are shaped like the one shown in FIGURE 5 and fit, in the same way, into dovetail-section slots 35a formed in the roller 1. It will be appreciated that the stave 3 is in this case of channel-section.

All the staves illustrated are made of aluminium, magnesium or other light metal or alloy. Because of the normal commercial tolerances allowed in the ordinary extrusion processes by which the staves may be produced from such materials, slight variations are found in the sizes of the staves produced and in order to accommodate such variations and in order to prevent chatter between adjacent staves, a strip of compressible material such as rubber may be fitted onto each stave either at its trailing edge or at its leading edge.

It will be appreciated that all the staves shown are of the same cross-sectional shape and area throughout their lengths, except for the holes 4 which are made at places spaced regularly along the length of the stave, and for the spaced legs 40 shown in FIGURE 7.

We claim:

1. A stave for mounting on a drum, comprising an elongated body of substantially rectangular part-cylindrical shape having inner and outer faces, said body being curved about an axis extending parallel to the length of said body and being formed with at least three rows of cylindrical holes extending through said body between said faces, pins within said holes, each of said pins having a cylindrical portion disposed within said hole, the walls of said hole releasably gripping said cylindrical portion and constituting the only part of said stave holding said pin, and projection means for spacing the inner face of said stave body from said drum.

2. A stave according to claim 1, said pins extending outwardly from the inner face of said body and having rearwardly and inwardly tapered rear portions of smaller dimensions than the said cylindrical portions of said pins, said tapered rear portions having a length at least equal to the length of said cylindrical holes.

3. A stave for mounting on a drum, comprising an elongated body of substantially rectangular part-cylindrical shape having inner and outer faces, said body being curved about an axis extending parallel to the length of the body and having two longitudinally extending edges, said body being formed with at least three rows of cylindrical holes extending through said body between said faces, pins fitted in said holes and having cylindrical portions gripped by the walls of said holes, said pins being inclined towards one of said longitudinal edges, constituting the leading edge of said stave, and at least one projection disposed at said leading edge and at said inner face for spacing said inner face at said leading edge from said drum, the said body being shaped at said leading edge to receive the trailing edge of an adjacent identical stave during use to space the inner face of said identical stave at the said trailing edge from said drum.

4. A stave according to claim 3, said pins sticking out from the inner face and having rear portions which are tapered so as to have rear ends of smaller dimensions than the said cylindrical portions of said pins, said tapered portions being longer than said cylindrical portions.

5. A stave according to claim 3, said leading edge being shaped to constitute a pair of relatively movable jaws for receiving said trailing edge, said body being formed with screw holes for the reception of screws for securing said stave to said drum and for causing said jaws to move to grip the said trailing edge.

6. A stave according to claim 5, said screw holes being disposed adjacent said leading edge.

7. A stave according to claim 3, said leading edge being shaped to provide both a seating to support said trailing edge and hold said trailing edge away from said drum, and an overhanging portion for cooperating with the said trailing edge to prevent said trailing edge being pulled away from said drum, the said over-hanging portion and the said seating being fixed relatively to one another.

8. A stave according to claim 3, said projection standing out from said inner face at longitudinally spaced points.

9. A stave according to claim 1, said body being made of aluminum.

10. A stave for mounting on a drum through at least one projection, comprising an elongated body of substantially rectangular part-cylindrical shape having inner and outer faces, said body being curved about an axis extending parallel to the length of the body and having two longitudinally extending edges and being formed with at least three rows of cylindrical holes extending through said body between said faces and with at least one opening at the inner face of said body for the reception of said projection for spacing said inner face of said body from said drum, said stave also comprising pins fitted in said holes and having cylindrical portions gripped by the walls of said holes.

11. A stave according to claim 10, said pins sticking out from the inner face and having rear portions which are tapered so as to have rear ends of smaller dimensions than the said cylindrical portions of said pins, said tapered rear portions having a length at least equal to the length of said cylindrical holes.

12. A stave according to claim 10, said pins being inclined towards one of said longitudinal edges, constituting the leading edge of said stave, the said at least one opening being disposed at said leading edge, the said body being shaped at said leading edge to receive the trailing edge of an adjacent identical stave to space the inner face of said identical stave at the said trailing edge from the said drum.

13. A combination comprising a drum, an array of staves fitted on said drum, each stave comprising a body of substantially rectangular part-cylindrical shape having inner and outer faces, each body being curved about an axis parallel to the length of said drum and being formed with at least three rows of cylindrical holes extending through said body between said faces, and each stave also comprising pins fitted in said holes and having cylindrical portions gripped by the walls of said holes and constituting the only part of said stave holding said pins, the combination also comprising projection means disposed between said drum and said inner faces of said stave bodies whereby a space is created between said drum and each of said stave bodies.

14. A combination according to claim 13, said inner face of each stave body being parallel to the drum surface.

15. A combination comprising a drum, an array of staves fitted on said drum, each stave comprising a substantially rectangular part-cylindrical body having inner and outer faces and curved about an axis parallel to the length of said body and said drum, said body having two longitudinal edges and being formed with at least three rows of cylindrical holes extending through said body between said faces, and each stave also comprising pins fitted in said holes and having cylindrical portions gripped by the walls of said holes, said pins being inclined towards one of said longitudinal edges, constituting the leading edge of said stave, said combination also comprising projection means disposed between said drum and said stave bodies at said leading edges to space them apart, each body at its leading edge receiving the trailing edge of the adjacent stave and serving to space from said drum the inner face of said adjacent stave body at said trailing edge.

16. A combination according to claim 15, and also comprising screws passing through said staves and into said drum to hold said staves in place, the screws serving to distort the leading edges of said stave bodies to cause them to grip the trailing edges.

17. A combination according to claim 15, said projection means extending between said drum and said staves at point longitudinally spaced from one another whereby spaces are left for the rear ends of the pins at the trailing edges of the said staves.

18. A combination according to claim 15, said projection means being integral with the staves.

19. A combination according to claim 18, the projection means including a dovetail portion projecting from opposite sides of said projection and having the same section for the whole length of the stave and inter-fitting with said drum through dovetail-section slots formed in said drum, said slots permitting said staves to be removed from said drum by longitudinal sliding.

20. A combination according to claim 18, and also comprising, for each stave, a longitudinally extending strip secured to said drum and formed with a lip, a portion of the projection means of the stave fitting under said lip whereby said stave is held, said lip permitting the removal of said stave from said drum by unhooking.

21. A combination according to claim 20, and comprising, for each stave, three screws serving to secure the respective strip to said drum, and two screws only, passing through the stave itself to hold it down on the drum.

22. A combination according to claim 18, said projection means for each stave comprising a longitudinally extending foot having the same cross-section throughout its length.

23. A combination according to claim 15, said projection means for each stave comprising separate members rigid with and secured to the drum.

24. A combination according to claim 23, each member being in the form of a cylindrical peg, one end of said peg being of reduced diameter and fitting into an opening formed in the respective stave.

25. A stave according to claim 3, said projection including a foot projecting from a side of said projection for holding said stave down on said drum.

26. A stave according to claim 3, said projection including a foot projecting from a side of said projection for holding said stave down on said drum, said foot extending toward the trailing edge of said stave.

27. A stave according to claim 26, said foot having the same section for the whole length of the stave.

28. A stave according to claim 3, said projection including a dovetail portion projecting from opposite sides of said projection and having the same section for the whole length of the stave.

29. A stave for mounting on a drum, comprising an elongated body of substantially rectangular part-cylindrical shape having inner and outer faces, said body being curved about an axis extending parallel to the length of the body and having two longitudinally extending edges, said body being formed with at least three rows of cylindrical holes extending through said body between said faces, pins fitted in said holes and having cylindrical portions gripped by the walls of said holes, said pins being inclined toward one of said longitudinal edges constituting the leading edge of said stave, and at least one projection engaging the inner face of said body adjacent one of said longitudinal edges for spacing said inner face at said longitudinal edge from said drum, said body being shaped at said longitudinal edge to receive the opposite longitudinal edge of an adjacent identical stave to space the inner face of said identical stave at the said opposite edge from said drum.

30. A stave according to claim 29, said pins sticking out from the inner face of said body and having rear portions which are tapered so as to have rear ends of smaller dimensions than the said cylindrical portions of said pins, said tapered rear portions having a length at least equal to the length of said cylindrical holes.

31. A combination comprising a drum, an array of staves fitted on said drum, each stave comprising a substantially rectangular part-cylindrical body having inner and outer faces and curved about an axis parallel to the length of said body and said drum, said body having two longitudinal edges and being formed with at least three rows of cylindrical holes extending through said body between said faces, and each stave also comprising pins fitted in said holes and having cylindrical portions gripped by the walls of said holes, said pins being inclined towards one of said longitudinal edges, constituting the leading edge of said stave, said combination also comprising projection means disposed between said drum and said staves at said longitudinal edges to space them apart, each body at its leading edge receiving the trailing edge of the adjacent stave and serving to space from said drum the inner face of said adjacent stave at said trailing edge.

32. A stave for mounting on a drum, comprising an elongated body of substantially rectangular part-cylindrical shape having inner and outer faces, said body being curved about an axis extending parallel to the length of the body and having two longitudinally extending edges, said body being formed with at least three rows of cylindrical holes extending through said body between said faces, pins fitted in said holes and having cylindrical portions gripped by the walls of said holes, said pins being inclined towards one of said longitudinal edges constituting the leading edge of said stave, said pins being in contact solely with the walls of said holes, and projections disposed at the said longitudinal edges and at said inner face for spacing said inner face from said drum.

33. A stave according to claim 32, said inner face and said projections defining a space with said drum extending the whole way from one end of said stave to the other.

References Cited in the file of this patent

UNITED STATES PATENTS

| 146,743 | Bard | Jan. 27, 1874 |
| 217,100 | Harding | July 1, 1879 |
| 1,413,833 | David | Apr. 25, 1922 |
| 1,784,843 | Losch | Dec. 16, 1930 |

FOREIGN PATENTS

| 1,139,521 | France | Feb. 11, 1957 |
| 435,791 | Great Britain | Sept. 27, 1935 |